(12) United States Patent
Ota

(10) Patent No.: US 11,154,955 B2
(45) Date of Patent: Oct. 26, 2021

(54) METHOD OF REPAIRING WIND TURBINE BLADE

(71) Applicant: MITSUBISHI HEAVY INDUSTRIES, LTD., Tokyo (JP)

(72) Inventor: Keisuke Ota, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 150 days.

(21) Appl. No.: 16/149,633

(22) Filed: Oct. 2, 2018

(65) Prior Publication Data

US 2019/0111528 A1 Apr. 18, 2019

(30) Foreign Application Priority Data

Oct. 13, 2017 (JP) .............................. JP2017-199214

(51) Int. Cl.
*B23P 6/00* (2006.01)
*F03D 80/50* (2016.01)
(Continued)

(52) U.S. Cl.
CPC .............. *B23P 6/002* (2013.01); *B29C 73/00* (2013.01); *B29C 73/04* (2013.01); *F03D 80/50* (2016.05);
(Continued)

(58) Field of Classification Search
CPC ......... B23P 6/002; B29C 73/04; B29C 73/00; B29C 73/02; F03D 80/50; F03D 80/30;
(Continued)

(56) References Cited

U.S. PATENT DOCUMENTS

| 4,978,404 | A | * | 12/1990 | Westerman, Jr. | ....... B29C 73/04 156/293 |
| 5,034,254 | A | * | 7/1991 | Cologna | ................. B29C 73/14 156/307.4 |

(Continued)

FOREIGN PATENT DOCUMENTS

| JP | 2014188995 A | 10/2014 |
| KR | 1020120068287 A | 6/2012 |

(Continued)

OTHER PUBLICATIONS

Office Action for Japanese Application No. 2017-199214 dated Nov. 2, 2018; 5pp.

(Continued)

*Primary Examiner* — David P Bryant
*Assistant Examiner* — Darrell C Ford
(74) *Attorney, Agent, or Firm* — Manabu Kanesaka; Benjamin Hauptman; Kenneth Berner

(57) ABSTRACT

Provided is a method of repairing damage on a wind turbine blade with a simple method. The method of repairing a wind turbine blade is a method of repairing a wind turbine blade for a damage portion caused by a lightning strike, including the steps of: generating in advance a repairing member molded in a predetermined flat plate shape and solidified; determining a damage determination range defined in advance for the damage portion; and bonding the repairing member when a result of inspecting the wind turbine blade indicates that the damage portion is within the damage determination range. The step of generating the repairing member may include stacking glass fiber materials to generate the repairing member.

14 Claims, 10 Drawing Sheets

(51) Int. Cl.
    *B29C 73/00*     (2006.01)
    *B29C 73/04*     (2006.01)
    *F03D 80/30*     (2016.01)
    *F03D 1/06*     (2006.01)
    *B29C 73/02*     (2006.01)

(52) U.S. Cl.
    CPC ............ *B29C 73/02* (2013.01); *F03D 1/0675* (2013.01); *F03D 80/30* (2016.05); *F05B 2230/80* (2013.01); *Y10T 29/49718* (2015.01); *Y10T 29/49732* (2015.01); *Y10T 29/49739* (2015.01); *Y10T 29/49746* (2015.01)

(58) Field of Classification Search
    CPC ............... F03D 1/0675; F05B 2230/80; Y10T 29/49718; Y10T 29/49732; Y10T 29/49739; Y10T 29/49746
    USPC ... 29/402.01, 402.09, 402.14, 402.18, 527.1, 29/527.2
    See application file for complete search history.

(56) References Cited

U.S. PATENT DOCUMENTS

| | | | | |
|---|---|---|---|---|
| 5,424,105 | A * | 6/1995 | Stewart | B29C 73/10 244/119 |
| 5,868,886 | A * | 2/1999 | Alston | B29C 65/564 156/92 |
| 5,958,166 | A * | 9/1999 | Walters | B29C 73/04 156/94 |
| 6,238,187 | B1 * | 5/2001 | Dulaney | B23P 6/005 416/223 R |
| 8,800,149 | B2 * | 8/2014 | Balsa Gonzalez | B64F 5/40 29/897.1 |
| 2006/0277753 | A1 * | 12/2006 | Ntsama-Etoundi | C21D 7/08 29/889.1 |
| 2007/0253827 | A1 * | 11/2007 | Dahl | H01Q 1/40 416/230 |
| 2008/0159870 | A1 * | 7/2008 | Hong | F01D 5/005 416/224 |
| 2010/0135820 | A1 * | 6/2010 | Olson | F03D 1/0675 416/241 R |
| 2011/0036482 | A1 * | 2/2011 | Stenbaek | B29C 73/10 156/98 |
| 2012/0163981 | A1 * | 6/2012 | Hong | B29C 73/26 416/224 |
| 2012/0297600 | A1 * | 11/2012 | Ullrich | G01N 21/9515 29/407.04 |
| 2013/0014367 | A1 * | 1/2013 | Miller | B29C 73/04 29/402.08 |
| 2014/0295124 | A1 | 10/2014 | Suhara et al. | |
| 2015/0093250 | A1 | 4/2015 | Busbey et al. | |
| 2015/0283653 | A1 * | 10/2015 | Krueger | F03D 80/40 29/611 |
| 2015/0308402 | A1 * | 10/2015 | Nielsen | B29C 66/3242 416/229 R |
| 2016/0258423 | A1 * | 9/2016 | Whitehouse | F03D 80/30 |
| 2016/0288245 | A1 * | 10/2016 | Ishino | B23K 1/0008 |
| 2017/0058860 | A1 | 3/2017 | Caruso et al. | |
| 2017/0122287 | A1 * | 5/2017 | Dobbe | B29C 66/00145 |
| 2018/0223799 | A1 * | 8/2018 | Kimura | B29C 73/10 |
| 2019/0177007 | A1 * | 6/2019 | Griess | B29C 73/10 |
| 2020/0263657 | A1 * | 8/2020 | Badger | B32B 37/0046 |
| 2020/0298351 | A1 * | 9/2020 | Girolamo | B23P 6/007 |
| 2021/0078277 | A1 * | 3/2021 | Jespersen | B29C 70/443 |
| 2021/0115892 | A1 * | 4/2021 | Haahr | B29C 66/54 |

FOREIGN PATENT DOCUMENTS

| | | |
|---|---|---|
| KR | 1020120068892 A | 6/2012 |
| KR | 101324978 B1 | 11/2013 |
| KR | 20140001407 A | 1/2014 |
| WO | 2017050893 A1 | 3/2017 |

OTHER PUBLICATIONS

Japan Patent Office, "Office Action for Japanese Patent Application No. 2017-199214," dated Nov. 2, 2018.

* cited by examiner

METHOD OF REPAIRING WIND TURBINE BLADE

RELATED APPLICATIONS

The present application claims priority from Japanese Application Number 2017-199214 filed Oct. 13, 2017, the disclosure of which is hereby incorporated by reference herein in its entirety.

TECHNICAL FIELD

This disclosure relates to a method of repairing a wind turbine blade.

BACKGROUND

Conventionally, as a countermeasure for damage on a wind turbine blade caused by a lightning stroke or the like, repairing or reinforcement has been performed on the wind turbine blade when required.

Patent Document 1 discloses an example of a technique of repairing and the like for a wind turbine blade, wherein an inner or outer circumference of a blade root portion of the wing turbine blade is reinforced along a circumference direction of the blade root portion.

CITATION LIST

Patent Literature

Patent Document 1: U.S. Patent Application Publication No. 2015/093250 (Specification)

SUMMARY

Preferably, appropriate repairing is performed within a short period of time in a wind turbine power generation facility while taking account of a configuration of an inspection target structure at the position of the damage, so that the period and cost required for the repairing can be reduced. Logically, relatively small damage is preferably repaired within a short period of time with a simple method. However, with the conventional technique described above, relatively small damage is repaired with large-scale repairing requiring a large work load and a long work period, which is not desirable.

In view of the above, an object of at least one embodiment of the disclosure is to provide a method of repairing damage on a wind turbine blade with a simple method.

(1) A method of repairing a wind turbine blade according to at least one embodiment of the disclosure is a method of repairing a wind turbine blade for a damage portion caused by a lightning strike, the method comprising the steps of:

generating in advance a repairing member molded in a predetermined flat plate shape and solidified;

determining a damage determination range defined in advance for the damage portion; and bonding the repairing member when a result of inspecting the wind turbine blade indicates that the damage portion is within the damage determination range.

A lightning strike, which may lead to various levels of damage on a wind turbine blade, results in only relatively small damage such as a crack, small hole, or the like in many cases. Thus, it is not work or cost efficient to conduct full- and large-scale repairing on any damage portion caused by a lightning strike. Still, full-scale repairing should be performed on a portion required to be rigid, or large damage so that sufficient strength can be ensured. In view of this, the above-described method (1) features the damage determination range defined in advance for the damage portion, so that whether simple repairing is sufficient or large-scale repairing is required can be determined in a simple manner. Furthermore, damage on a wind turbine blade caused by a lightning stroke can be appropriately repaired with a simple method including: generating in advance the repairing member; and bonding the repairing member when the damage portion is within the damage determination range. Thus, a relatively light damage portion can be treated with the simple method according to the disclosure, whereby the cost and work period can be reduced.

(2) In some embodiments, in the above-described method (1), the step of generating the repairing member may include stacking glass fiber materials to generate the repairing member.

In the above-described method (2), the repairing member is generated by stacking the glass fiber materials. With the repairing member thus generated with the material equivalent to the glass fiber material, which is preferably used as a base material for surfaces of many wind turbine blades, it is possible to appropriately recover sufficient strength by repairing.

(3) In some embodiments, in the above-described method (1) or (2), the repairing member may be formed to have a size enough to encompass the damage determination range.

In the above-described method (3), the repairing member is formed to have a size enough to encompass the damage determination range. Thus, the damage portion within the damage determination range can be appropriately repaired with a simple method of bonding the repairing member.

(4) In some embodiments, in any one of the above-described methods (1) to (3), the damage determination range may be defined by a circle with a diameter d.

In the above-described method (4), the damage determination range is defined by the circle with the diameter d. Thus, whether the damage portion is within the damage determination range can be appropriately determined by determining whether the damage portion is within the circle with the diameter d.

(5) In some embodiments, in the above-described method (4), the repairing member may be defined by a circle with a diameter D that is twice the diameter d or larger.

In the above-described method (5), the repairing member is defined by a circle with a diameter that is twice or larger the diameter of the damage determination range, which is defined by the circle with the diameter d. Thus, the damage portion within the damage determination range can be appropriately repaired with sufficient strength ensured.

(6) In some embodiments, in any one of the above-described methods (2) to (5), when a direction of attachment of the glass fiber materials forming the repairing member to the wind turbine blade is from an outer side to an inner side of the wind turbine blade, the glass fiber material on the outer side may have a larger diameter than the glass fiber material on the inner side.

In the above-described method (6), a plurality of glass fiber layers, stacked for generating the repairing member, include the glass fiber material on the outer side having a larger diameter than the glass fiber material on the inner side. Thus, the glass fiber material directly covering the damage portion can be covered with the glass fiber material with a larger diameter from the outer side, whereby the damage portion can be more effectively covered to be repaired.

(7) In some embodiments, in any one of the above-described methods (2) to (6), when a direction of attachment to the wind turbine blade is from an outer side to an inner side of the wind turbine blade, the step of generating the repairing member may include applying a coating material containing gelcoat, to a surface of the glass fiber material on the outer side, and the step of bonding the repairing member may include bonding a surface of the repairing member on the inner side to the damage portion.

In the above-described method (7), the coating material containing gelcoat is applied to the surface of the glass fiber material for generating the repairing member in the step of generating in advance the repairing member. Thus, a work load for applying the gelcoat on the surface of the repairing member after the repairing can be reduced, whereby further simplification of the repairing work as a whole can be achieved.

(8) In some embodiments, in any one of the above-described methods (1) to (7), the repairing member may have a circular shape with a thickness of 3 mm or less and a diameter of ϕ200 mm or less, and when a direction of attachment to the wind turbine blade is from an outer side to an inner side of the wind turbine blade, the repairing member may be formed to have a protruding shape protruding toward the outer side and having a radius of curvature of 300 mm or more.

In the above-described method (8), the repairing member has a protruding shape protruding toward the outer side of the wind turbine blade. Thus, the repairing member more appropriately conforming to the shape of the wind turbine blade can be attached. As a result, the strength can be more appropriately maintained against bending, torsion, and other stress on the wind turbine blade after the repairing.

(9) In some embodiments, any of the above-described methods (1) to (8) may further comprise a step of measuring a distance 1 between a blade tip of the wind turbine blade to the damage portion, and the repairing member may be bonded to the damage portion when the distance 1 is 20% or less of a blade length L of the wind turbine blade.

Generally, the damage portion of the wind turbine blade, caused by a lightning stroke, tends to concentrate on the blade tip portion and includes damage of various sizes. Even relatively small damage portions might allow raindrops to enter the interior of the wind turbine blade, and thus it is not preferable to leave such damage in terms of strength. Furthermore, even a small damage portion left unrepaired may lure the next lightning strike. All things considered, it is important to determine a criterion for determining how a damage portion formed at the blade tip, which is easily subjected to a lightning stroke, is repaired.

In view of this, in the above-described method (9), the repairing for a damage portion formed within a range of 20% or less of the blade length L from the blade tip is set in advance to be performed with a simple method. Thus, determination of appropriately repairing damage satisfying a condition can be appropriately made.

(10) In some embodiments, in any one of the above-described methods (1) to (9), a bulging height of the repairing member from an outer skin of the wind turbine blade after the repairing member is bonded may be 5 mm or less.

In the above-described method (10), the bulging height of the repairing member from the outer skin of the wind turbine blade is set to be 5 mm or less. Thus, wind noise due to unevenness or steps on the surface of the wind turbine blade can be reduced during an operation after the repairing.

(11) In some embodiments, any of the above-described methods (1) to (10) may further comprise, after the step of bonding the repairing member, a step of smoothing by sanding a step in a boundary portion between the repairing member and an outer skin of the wind turbine blade, and applying a coating material containing gelcoat.

With the above-described method (11), the step in the boundary portion between the repairing member after being bonded and the outer skin of the wind turbine blade can be reduced by the smoothing. Thus, the surface of the wind turbine blade and the repairing member can be more smoothly integrated.

(12) In some embodiments, in the above-described method (11), the step of smoothing may include smoothing to reduce a step in a boundary portion between the repairing member and an outer skin of the blade to 200 μm or less.

With the above-described method (12), the smoothing can further reduce the step in the boundary portion between the repairing member and the outer skin of the blade.

(13) In some embodiments, any of the above-described methods (1) to (12) may further comprise:

removing a gelcoat layer in a range in which damage including a crack or a hole is recognizable, from the damage portion; and measuring a dimension of the damage in the damage portion to check whether the dimension is smaller than the damage determination range.

With the above-described method (13), the gelcoat layer is removed, so that the damage portion can more clearly appear, whereby the dimension of the damage portion can be more accurately determined.

(14) In some embodiments, in any one of the above-described methods (1) to (13), the step of bonding the repairing member may include:
applying an adhesive to a surface of the repairing member on an inner side;
injecting the adhesive into damage including a crack or a hole, and applying the adhesive to the damage portion;
pressing the repairing member against the damage portion to make the adhesive overflow from a periphery of the repairing member; and
fixing the repairing member until the adhesive is cured.

In the above-described method (14), the damage portion and the repairing member, both on which the adhesive is applied, are pressed against each other so that the adhesive overflows, and then the repairing member is fixed until the adhesive is cured. Thus, the repairing member can be more effectively fixed on the surface of the wind turbine blade.

With at least one embodiment of the disclosure, a method of repairing damage on a wind turbine blade with a simple method can be provided.

DETAILED DESCRIPTION

Figure 1:
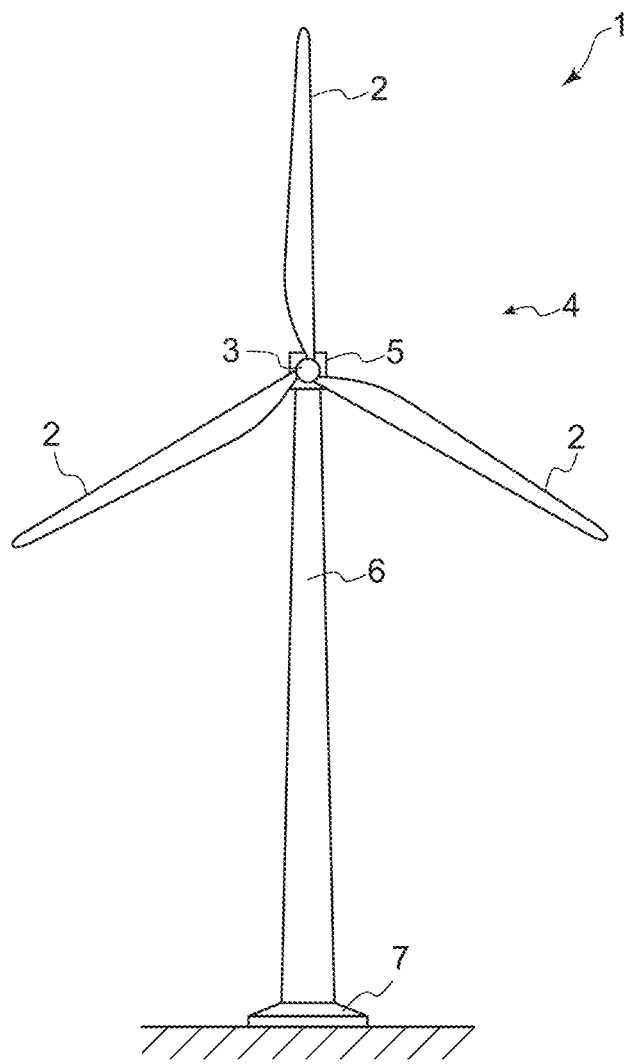
FIG. 1 is a schematic view illustrating a wind turbine power generation facility employing a method of repairing a wind turbine blade according to one embodiment.

Some embodiments of the disclosure are described with reference to the accompanying drawings. The size, material, shape, other relative arrangements, and the like described as embodiments or illustrated in the drawings are not intended to limit the scope of the disclosure to these, and are merely illustrative.

For example, expressions that represent relative or absolute arrangements such as "in a direction", "along a direction", "parallel", "perpendicular", "center", "concentric", or "coaxial" refer not only to what exactly these expressions represent but also to states that allow tolerance or are relatively displaced by such a degree of angle or distance that can achieve the same functions.

For example, expressions that means things are in an identical state such as "same", "identical", or "homogenous" refer not only to exactly identical states but also to states that allow tolerance or include such a difference that can achieve the same functions.

For example, expressions on shapes such as rectangular or cylindrical refer not only to shapes such as rectangular or cylindrical in a geometrically exact sense but also to such shapes that include protrusions, recesses, chamfered parts, or the like as long as the same functions are available.

Expressions that represent "comprising", "including", "being provided with", "with", or "having" one component are not exclusive expressions that would exclude the existence of other component(s).

Figure 2:
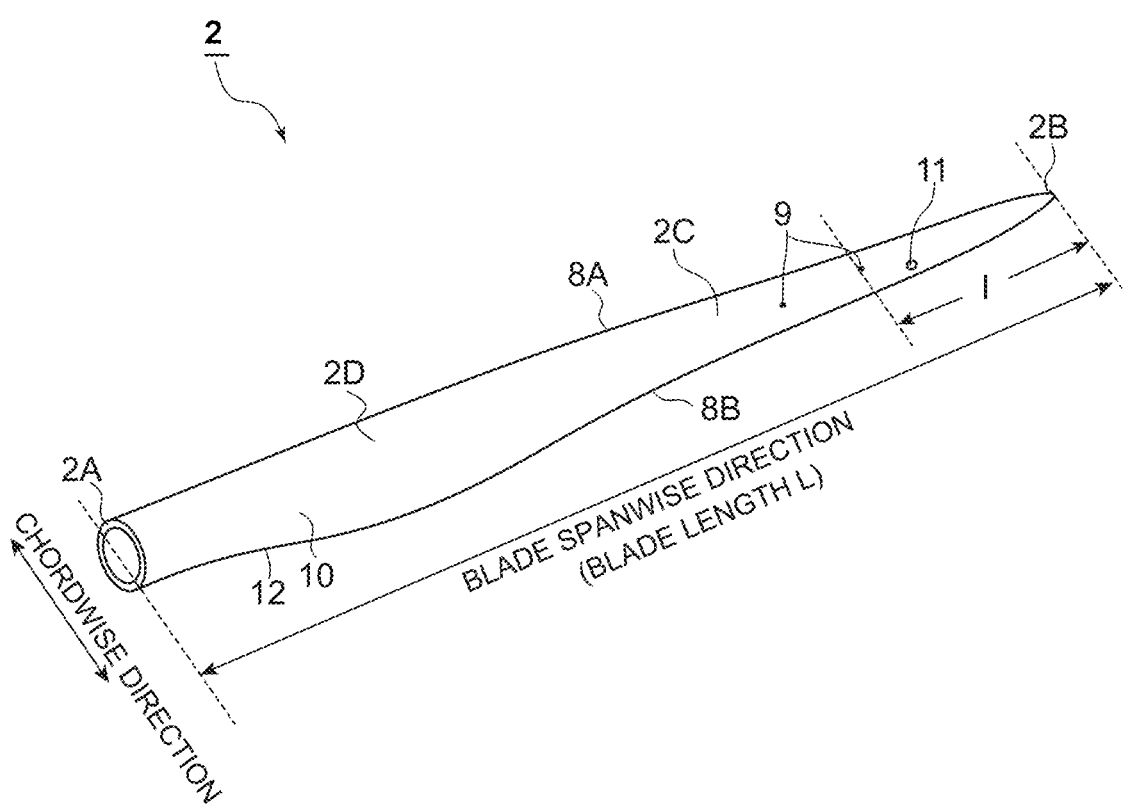
FIG. 2 is a perspective view illustrating the entire wind turbine blade according to one embodiment.

FIG. 1 is a schematic view illustrating a wind turbine power generation facility employing a method of repairing a wind turbine blade according to one embodiment. FIG. 2 is a perspective view illustrating the entire wind turbine blade according to one embodiment.

As illustrated in FIG. 1, a wind turbine power generation facility according to at least one embodiment of the disclosure (hereinafter, referred to as a wind turbine 1) includes: a rotor 4 including a plurality of (three in the example illustrated in FIG. 1) wind turbine blades 2 and a hub 3 to which the wind turbine blades 2 are attached; a nacelle 5 that rotatably supports the rotor 4 via a main shaft and a main bearing (not illustrated); a tower 6 supporting the nacelle 5 yaw-rotatably; and a base 7 on which the tower 6 is installed. The number of wind turbine blades 2 may be more than or less than three.

As illustrated in FIG. 2, in some embodiments, the wind turbine blades 2 each include a blade main body 2C extending from a blade root portion 2A to a blade tip portion 2B, along a longitudinal direction (blade spanwise direction).

The blade main body 2C includes: the blade root portion 2A attached to the hub 3 of the wind turbine 1; the blade tip portion 2B that is a portion farthest from the hub 3; and an airfoil portion 2D extending between the blade root portion 2A and the blade tip portion 2B along the blade spanwise direction. The blade main body 2C further includes a leading edge 8A and a trailing edge 8B both extending from the blade root portion 2A to the blade tip portion 2B. The blade main body 2C has an outer shape defined by a suction surface 10 and a pressure surface 12 opposite to the suction surface 10.

The "blade spanwise direction" as used in this specification is a direction between the blade root portion 2A and the blade tip portion 2B, and a "chordwise direction (blade chordwise direction)" is a direction along a line (chord) between the leading edge 8A and the trailing edge 8B of the blade main body 2C. The "blade root portion" is a cylindrical portion of the wind turbine blade 2, with a substantially circular cross-sectional shape. The blade root portion is within a range of 5 m in the blade spanwise direction from a blade-root-side end surface of the blade main body 2C of the wind turbine blade 2 (typically within a range of 1 to 3 m from the end surface).

Figure 3:
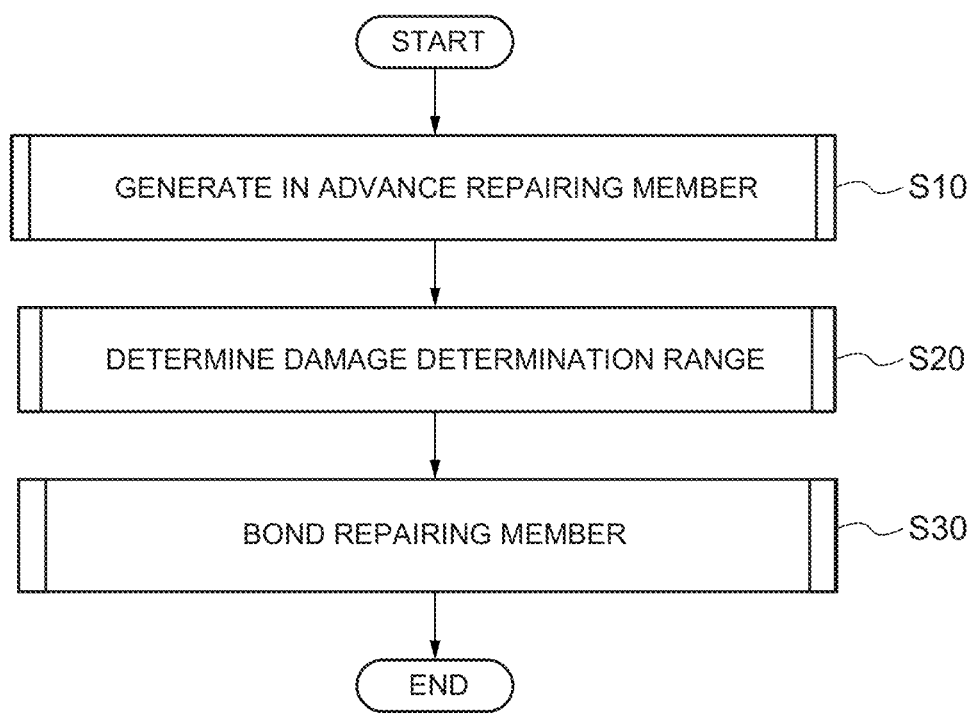
FIG. 3 is a flowchart illustrating processes in the method of repairing a wind turbine blade according to one embodiment.
Figure 4:
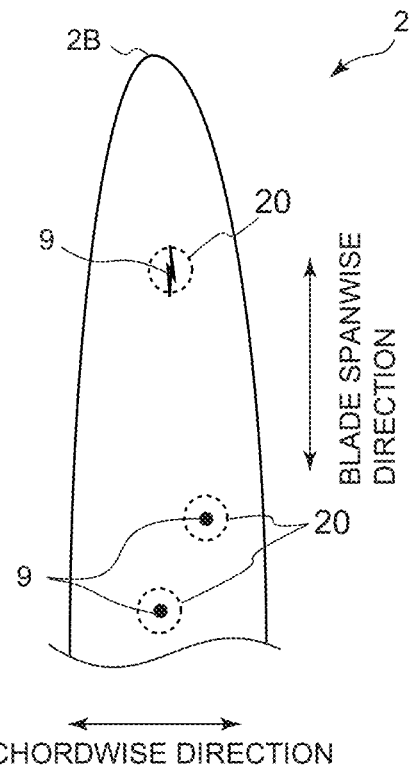
FIG. 4 is a diagram illustrating a damage portion on the wind turbine blade for which the method of repairing a wind turbine blade according to one embodiment is performed.
Figure 5:
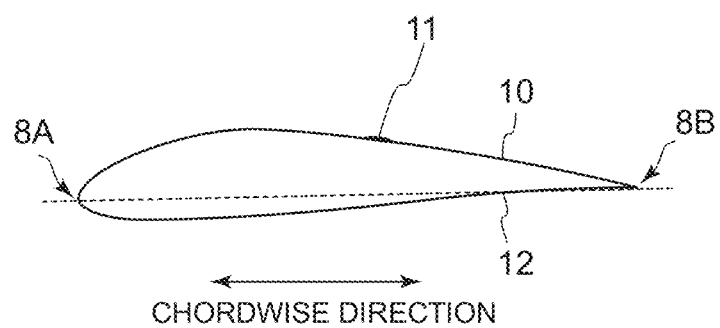
FIG. 5 is a diagram illustrating a state where a repairing member is bonded to the wind turbine blade as a result of performing the method of repairing a wind turbine blade according to one embodiment.

FIG. 3 is a flowchart illustrating processes in the method of repairing a wind turbine blade according to one embodiment. FIG. 4 is a diagram illustrating a damage portion on the wind turbine blade for which the method of repairing a wind turbine blade according to one embodiment is performed. FIG. 5 is a diagram illustrating a state where a repairing member is bonded to the wind turbine blade as a result of performing the method of repairing a wind turbine blade according to one embodiment.

As illustrated in FIG. 1 to FIG. 5, a method of repairing a wind turbine blade according to at least one embodiment of the disclosure is a method of repairing the wind turbine blade 2 for a damage portion 9 caused by a lightning strike. The method includes the steps of: generating in advance a repairing member 11 molded in a predetermined flat plate shape and solidified (step S10); determining a damage determination range 20 defined in advance for the damage portion 9 (step S20); and bonding the repairing member 11 when a result of inspecting the wind turbine blade 2 indicates that the damage portion 9 is within the damage determination range 20 (step S30).

The step of generating in advance the repairing member 11 (step S10) is implemented by producing the repairing member 11 in advance in a factory or the like, for example. The repairing member 11 is for covering and closing the damage portion 9, such as a crack or a small hole, caused by a lightning stroke or the like on the outer skin of the wind turbine blade 2.

In the step of determining the damage determination range 20 (step S20), the size of the damage portion 9, such as a crack or small hole, repairable with the repairing member 11 is determined. The crack or small hole with a size within the damage determination range 20 determined in this step S20 may be repaired with a relatively simple method of repairing a wind turbine blade according to some embodiments of the disclosure, performed in an installation site of the wind turbine 1. On the other hand, a crack or small hole exceeding the size of the damage determination range 20 may be repaired by repairing of a larger scale involving drilling, resin injection, ultrasonic testing (UT), and the like.

Figure 10:
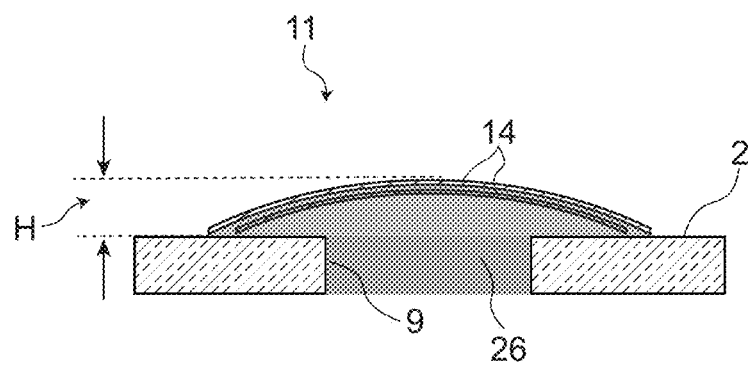
FIG. 10 is a diagram illustrating a glass fiber layer in a repairing member according to some embodiments.

The step of bonding the repairing member 11 (step S30) is performed in the installation site of the wind turbine 1, and includes: inspecting the outer skin of the wind turbine blade 2 removed from the rotor 4; and when the damage portion 9 within the size of the damage determination range 20 determined in step S20 is found (see FIG. 4), bonding the repairing member 11 prepared in advance to the damage portion 9 with an adhesive 26 (see FIG. 10). In this manner, the repairing member 11 is bonded to the damage portion 9 (see FIG. 2 and FIG. 5).

A lightning strike may lead to various levels of damage on the wind turbine blade 2, and may result in only relatively small damage such as a crack, small hole, or the like. Thus, it is not work or cost efficient to conduct full- and large-scale repairing on any damage portion 9 caused by a lightning strike. Still, full-scale repairing should be performed on a portion required to be rigid, or large damage so that sufficient strength can be ensured. In view of this, the above-described method features the damage determination range 20 defined in advance for the damage portion 9, so that whether simple repairing is sufficient or large-scale repairing is required can be determined in a simple manner. Furthermore, damage on the wind turbine blade 2 caused by a lightning stroke can be appropriately repaired with a simple method including: generating in advance the repairing member 11; and bonding the repairing member 11 when the damage portion 9 is within the damage determination range 20. Thus, a relatively light damage portion 9 can be treated with the simple method according to the disclosure, whereby the cost and work period can be reduced with the strength of the wind turbine blade 2 ensured.

Figure 6:
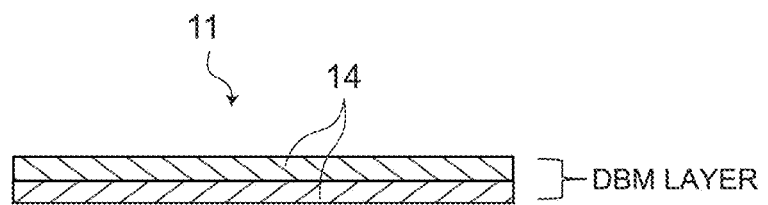
FIG. 6 is a side cross-sectional view illustrating a repairing member according to some embodiments.

FIG. 6 is a side cross-sectional view illustrating a repairing member according to some embodiments.

As illustrated in FIG. 6, in some embodiments, the step of generating the repairing member 11 (step S10) may include stacking glass fiber layers 14 to generate the repairing member 11. For example, the glass fiber layer 14 may be glass fiber reinforced plastics (GFRP) obtained by impregnating curing a stack of glass fiber material, such as double bias mat (DBM) or uni direction (UD), impregnated with resin. In this method, the repairing member 11 is generated by stacking the glass fiber layers 14. With the repairing member 11 thus generated with the material equivalent to the glass fiber material, which is preferably used as a base material for surfaces of many wind turbine blades 2, the repairing can appropriately recover sufficient strength.

Figure 7:
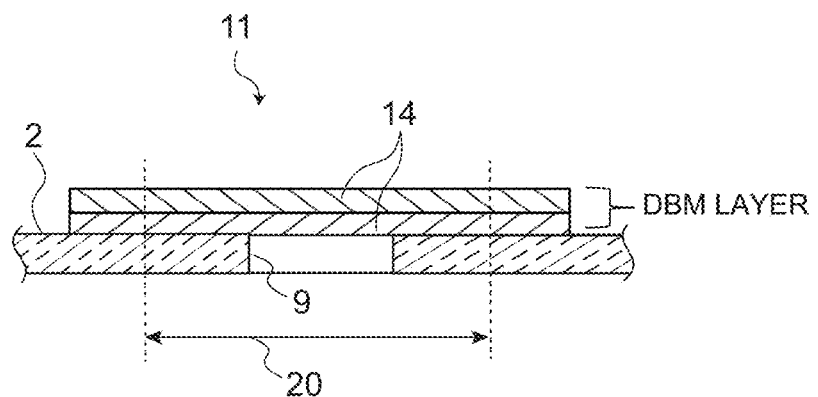
FIG. 7 is a side cross-sectional view illustrating a repairing member according to some embodiments.

FIG. 7 is a side cross-sectional view illustrating a repairing member according to some embodiments.

As illustrated in FIG. 7, in some embodiments, the repairing member 11 may be formed to have a size enough to encompass the damage determination range 20. In this method, the repairing member 11 is formed to have a size enough to encompass the damage determination range 20, and thus the damage portion 9 within the damage determination range 20 can be appropriately repaired with a simple method of bonding the repairing member 11.

Figure 8:
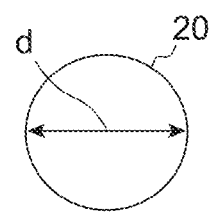
FIG. 8 is a diagram illustrating a damage determination range according to some embodiments.
Figure 9:
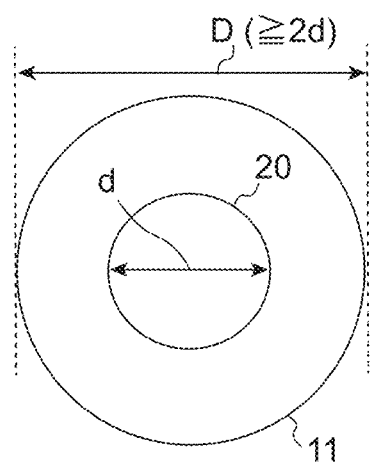
FIG. 9 is a diagram illustrating a damage determination range according to some embodiments.

FIG. 8 and FIG. 9 are each a diagram illustrating a damage determination range according to some embodiments.

In some embodiments, the damage determination range 20 may be defined by a circle with a diameter d (for example, see FIG. 4 and FIG. 8). In this method, the damage determination range 20 is defined by the circle with the diameter d, and thus whether the damage portion 9 is within the damage determination range 20 can be appropriately determined by determining whether the damage portion 9 is within the circle with the diameter d.

In some embodiments, the repairing member 11 may be defined by a circle with a diameter D that is twice the diameter d or larger (for example, see FIG. 9). In this method, the repairing member 11 is formed in a circle with a diameter that is twice the diameter of the damage determination range 20, which is defined by the circle with the diameter d, or larger. Thus, the damage portion 9 within the damage determination range 20 can be appropriately repaired with sufficient strength ensured.

Figure 11:
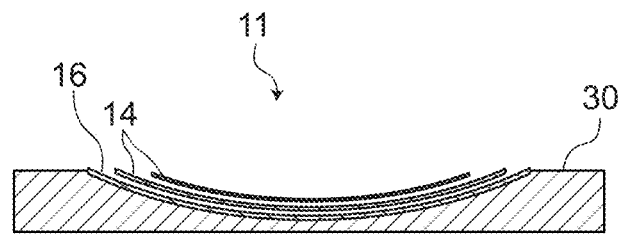
FIG. 11 is a diagram illustrating a glass fiber layer in a repairing member according to some embodiments.

FIG. 10 and FIG. 11 are each a diagram illustrating a glass fiber layer in a repairing member according to some embodiments. FIG. 10 is a side cross-sectional view illustrating a state where the repairing member 11 is bonded to the wind turbine blade 2. FIG. 11 is a side cross-sectional view illustrating a process of forming the repairing member 11 in advance.

In some embodiments, when a direction of attachment of the glass fiber layers 14 forming the repairing member 11 to the wind turbine blade 2 is from an outer side to an inner side of the wind turbine blade 2, the glass fiber layer 14 on the outer side may have a larger diameter than the glass fiber layer 14 on the inner side (for example, see FIG. 10). In this method, a plurality of glass fiber layers 14, stacked for generating the repairing member 11, include the glass fiber layer 14 on the outer side having a larger diameter than the glass fiber layer 14 on the inner side. Thus, the glass fiber layer 14 directly covering the damage portion 9 can be covered with the glass fiber layer 14 with a larger diameter from the outer side, whereby the damage portion 9 can be more effectively closed to be repaired. For example, the glass fiber layer 14 may each be set in such a manner that the glass fiber layer 14 on the outer side and the glass fiber layer 14 on the inner side respectively have a diameter of ϕ80 mm and a diameter of ϕ50 mm, or the like.

In some embodiments, when a direction of attachment to the wind turbine blade 2 is from an outer side to an inner side of the wind turbine blade 2, the step of generating the repairing member 11 (step S10) may include applying a coating material (gelcoat layer 16) containing gelcoat, to a surface of the glass fiber layer 14 on the outer side (for example, see FIG. 11), and the step of bonding the repairing member 11 (step S20) may include bonding a surface of the repairing member 11 on the inner side to the damage portion 9. In this method, the coating material containing gelcoat is applied to the surface of the glass fiber layer 14 for generating the repairing member 11 in the step of generating in advance the repairing member 11. Thus, a work load for applying the gelcoat layer 16 on the surface of the repairing member 11 after the repairing can be reduced, whereby further simplification of the repairing work as a whole in the installation site of the wind turbine 1 can be achieved. A surface of the repairing member, obtained by stacking the glass fiber layers 14 and the gelcoat layer 16, opposite to the gelcoat layer 16 (the surface to be bonded to the damage portion 9 of the wind turbine blade 2) may be pretreated by roughening before being bonded to the damage portion 9. With this configuration, the repairing member 11 and the wind turbine blade 2 can be more effectively bonded to each other by the adhesive 26.

In some embodiments, the repairing member 11 may have a circular shape with a thickness of 3 mm or less and a diameter D of ϕ200 mm or less, and when a direction of attachment to the wind turbine blade 2 is from an outer side to an inner side of the wind turbine blade 2, the repairing member 11 may be formed to have a protruding shape protruding toward the outer side and having a radius of curvature of 300 mm or more (for example, see FIG. 10 and FIG. 11). In this method, the repairing member 11 has a protruding shape protruding toward the outer side of the wind turbine blade 2. Thus, the repairing member 11 more appropriately conforming to the shape of the wind turbine blade 2 can be attached. As a result, the strength can be more appropriately maintained against bending, torsion, and other stress on the wind turbine blade 2 after the repairing. In some embodiments, the repairing member 11 may have a thickness of approximately 1 to 2 mm, the diameter D of approximately ϕ80 mm, a radius of curvature of approximately 400 mm FIG. 12 is a flowchart illustrating a process in a method of repairing a wind turbine blade according to another embodiment.

Figure 12:
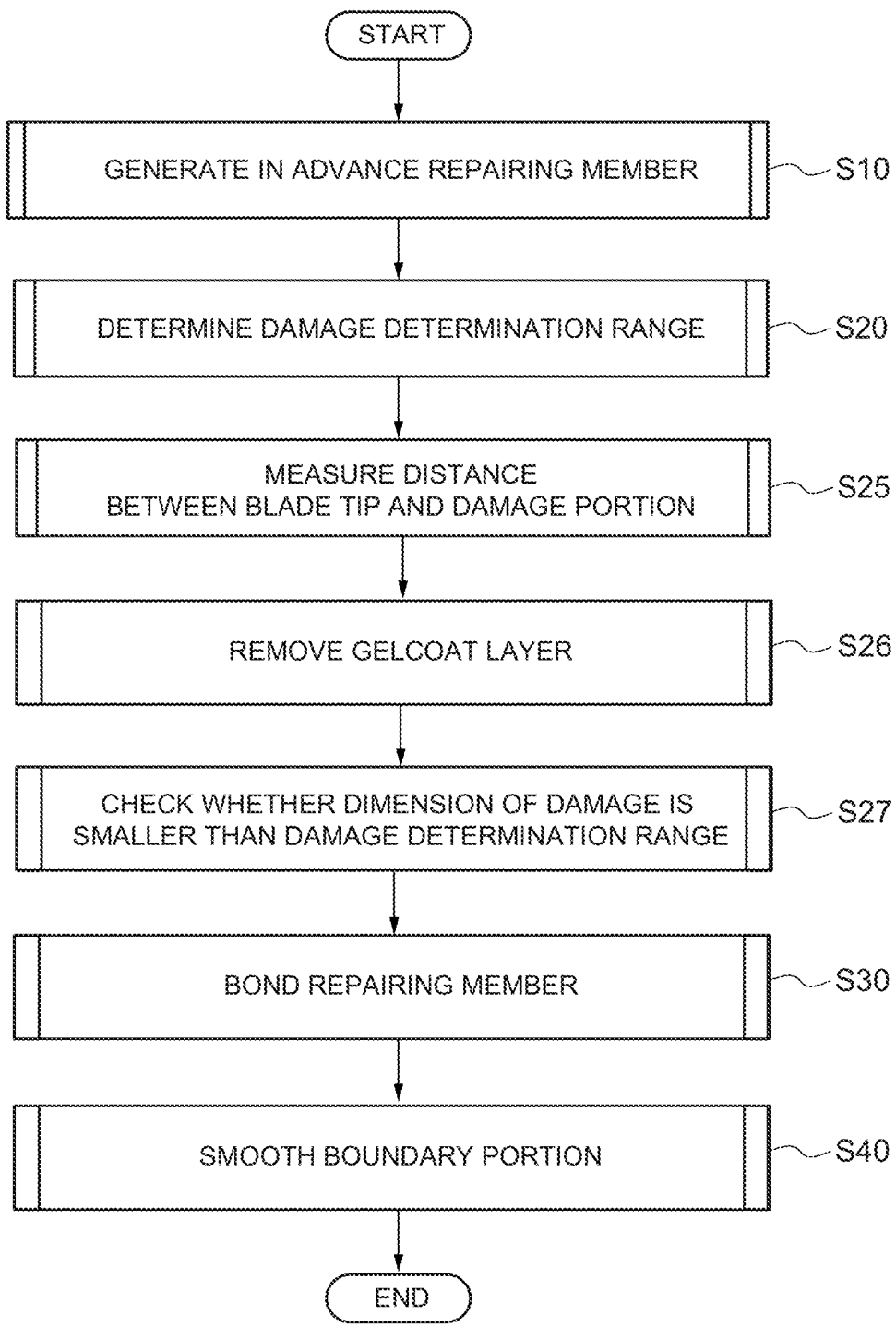
FIG. 12 is a flowchart illustrating a process in a method of repairing a wind turbine blade according to another embodiment.

In some embodiments, as illustrated in FIG. 12 for example in a non-limiting manner, the method of repairing a wind turbine blade may further include a step of measuring a distance 1 (see FIG. 1) between the blade tip of the wind turbine blade 2 to the damage portion 9 (step S25), and the repairing member 11 may be bonded to the damage portion when the distance 1 is 20% or less of the blade length L of the wind turbine blade 2.

The damage portion 9 of the wind turbine blade 2, caused by a lightning stroke, tends to concentrate on the blade tip portion and includes damage of various sizes. Even relatively small damage portions 9 might allow raindrops to enter the interior of the wind turbine blade 2, and thus it is not preferable to leave such damage in terms of strength. Furthermore, even a small damage portion 9 left unrepaired may lure the next lightning strike. All things considered, it is important to determine a determination criterion for repairing a damage portion 9 formed on the blade tip portion 2B side, which is easily subjected to a lightning stroke.

In view of this, in the above-described method, the repairing for a damage portion 9 formed within a range of 20% or less of the blade length L from the blade tip portion 2B (1≤0.2L) is set in advance to be performed with a simple method. Thus, determination of appropriately repairing damage satisfying a condition can be appropriately made.

In some embodiments, a bulging height H of the repairing member 11 from an outer skin of the wind turbine blade after the repairing member 11 is bonded may be 5 mm or less (see FIG. 10). With this method, aerodynamic effects on the output can be reduced as much as possible, and wind noise due to unevenness or steps on the surface of the wind turbine blade 2 can be reduced during an operation of the wind turbine 1 after the repairing. In some embodiments, the bulging height H may be set to be 2 to 3 mm for example.

FIG. 12 is a flowchart illustrating a process in a method of repairing a wind turbine blade according to another embodiment.

As illustrated in FIG. 12, in some embodiments, the method may further include, after the step of bonding the repairing member 11 (step S30), a step of smoothing by sanding a step in a boundary portion 28 (see FIG. 14I and FIG. 14J) between the repairing member 11 and an outer skin of the wind turbine blade 2, and applying a coating material containing gelcoat (step S40).

In this method, the step in the boundary portion 28 between the repairing member 11 after being bonded and the outer skin of the wind turbine blade 2 can be reduced by the smoothing. Thus, the surface of the wind turbine blade 2 and the repairing member 11 can be more smoothly integrated.

In some embodiments, the step of smoothing may include smoothing to reduce a step in the boundary portion 28 between the repairing member 11 and an outer skin of the wind turbine blade 2 to 200 μm or less. With this method, the smoothing can further reduce the step in the boundary portion 28 between the repairing member 11 and the outer skin of the wind turbine blade 2 (see FIG. 14I and FIG. 14J, for example).

In some embodiments, as illustrated in FIG. 12 for example, the method may further include removing a gelcoat layer 16 in a range in which damage including a crack or a hole is recognizable, from the damage portion 9 (step S26), and measuring a dimension of the damage in the damage portion 9 to check whether the dimension is smaller than the damage determination range 20 (step S27).

With this method, the gelcoat layer 16 is removed, so that the damage portion 9 can more clearly appear, whereby the dimension of the damage portion 9 can be more accurately determined.

Figure 13:
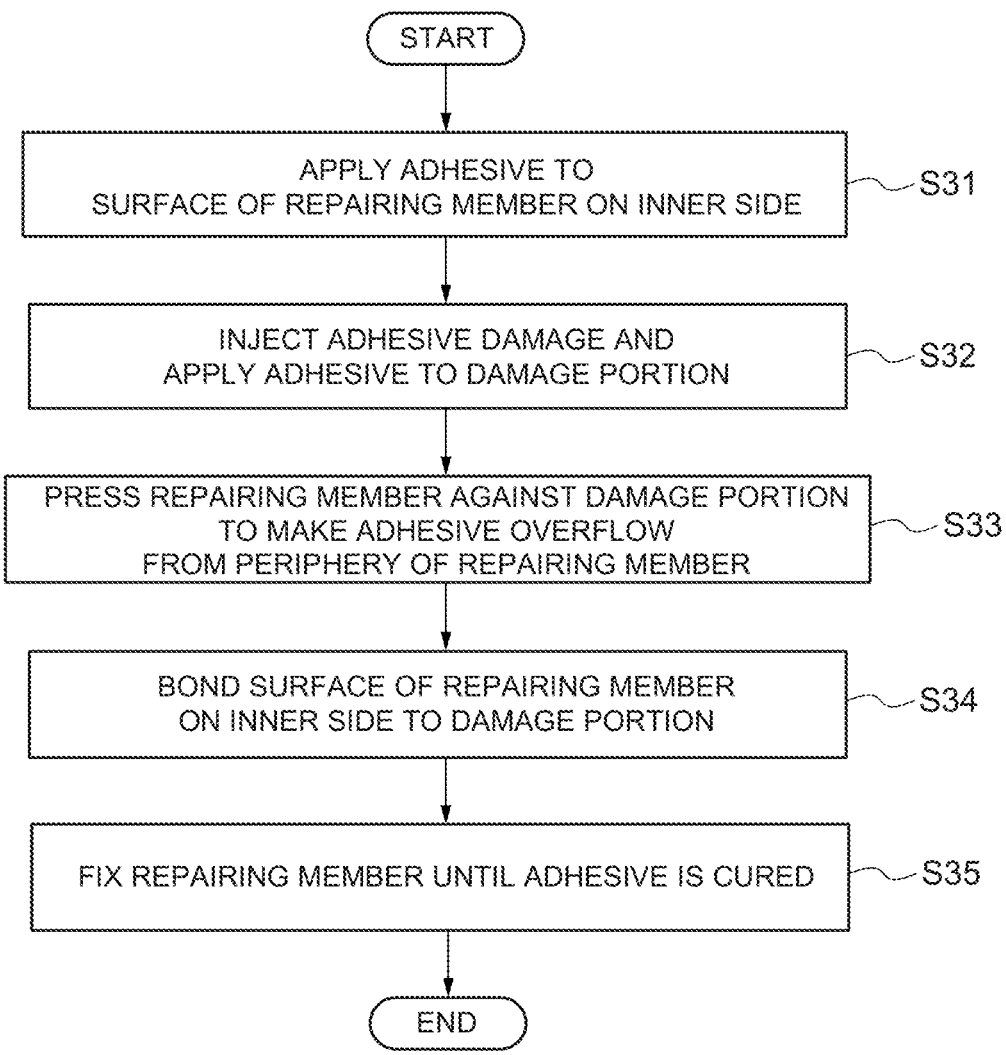
FIG. 13 is a flowchart illustrating a process in a method of repairing a wind turbine blade according to one embodiment in detail.

FIG. 13 is a flowchart illustrating a process in a method of repairing a wind turbine blade according to one embodiment in detail.

In some embodiments, as illustrated in FIG. 13 for example in a non-limiting manner, the step of bonding the repairing member 11 (step S30) may include: applying an adhesive to a surface of the repairing member 11 on an inner side (step S31); injecting the adhesive 26 into damage including a crack or a hole, and applying the adhesive 26 to the damage portion 9 (step S32); pressing the repairing member 11 against the damage portion 9 to make the adhesive 26 overflow from a periphery of the repairing member 11 (step S33); bonding the surface of the repairing member 11 on the inner side to the damage portion 9 (step S34); and fixing the repairing member 11 until the adhesive 26 is cured (step S35).

In this method, the damage portion 9 and the repairing member 11, both on which the adhesive 26 is applied, are pressed against each other so that the adhesive 26 overflows, and then the repairing member 11 is fixed until the adhesive 26 is cured. Thus, the repairing member 11 can be more effectively fixed on the surface of the wind turbine blade 2.

Now a description is given on an example where the damage portion 9 on the wind turbine blade 2 is repaired with the method of repairing the wind turbine blade 2 described above.

First of all, the repairing member 11 having a shape of a disk with a diameter of ϕ80 mm for example is generated in advance in a factory. Specifically, a release material and the gelcoat layer 16 are applied in this order in a recess (curved surface portion) of a plate shaped template 30. Then, two glass fiber layers 14 (DBM for example) are stacked on the resultant structure. Specifically, the first glass fiber layer 14 having a diameter of ϕ80 mm is placed on the gelcoat layer 16, and then the second glass fiber layer 14 having a diameter of ϕ50 mm is stacked on the first glass fiber layer 14. When the DBM is stacked, its mat surface is arranged to be on a mold surface side (the side of the gelcoat layer 16). This structure is cured and then is released. Then, the burr on the edges is removed so that the repairing member 11 having a circular shape (φ80) is obtained. The repairing member 11 thus generated has the gelcoat layer 16 applied to one surface (front surface). A masking tape 22 may be attached to the gelcoat layer 16 for protection. In such a case, the masking tape 22 may be cut into a circular shape along the outer circumference of the repairing member 11. The repairing member 11 may have the other surface (surface to be bonded to the wind turbine blade 2) treated by roughening.

FIG. 14A to FIG. 14J are each a diagram illustrating a method of repairing a wind turbine blade according to some embodiments. In the figures, some configurations are omitted for the sake of description. In the example illustrated in FIG. 14A to FIG. 14J, the surface of the wind turbine blade 2 removed from the rotor 4 is repaired by using the repairing member 11 generated in advance by stacking and curing the glass fiber layers 14.

The method includes: inspecting the wind turbine blade 2; and when the damage portion 9 is found on the surface of the wind turbine blade 2 (see FIG. 14A), measuring the dimension of the damage portion 9 as well as the distance 1 from the blade tip portion 2B.

For example, the method of repairing a wind turbine blade according to the disclosure may be employed when the following conditions (1) to (3) are satisfied.

(1) The damage portion 9 is within a range of 5.5 m from the blade tip portion 2B (approximately 0.2L relative to the blade length L).

(2) The damage portion 9 has a diameter (or a length of the longest portion) of 3 mm or less.

(3) A black carbonized portion found after the gelcoat layer 16 has been removed from the wind turbine blade 2 (including a peeled range) has a diameter of φ30 mm or less.

A conventional repairing for lightening damage may be by performed when the conditions (1) to (3) are not satisfied.

Figure 14A:
FIG. 14A to FIG. 14I are each a diagram illustrating a method of repairing a wind turbine blade according to some embodiments.
Figure 14B:
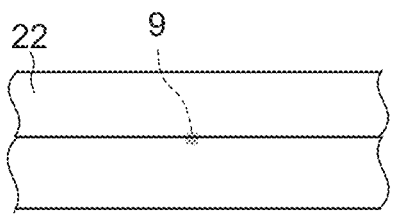
Figure 14C:
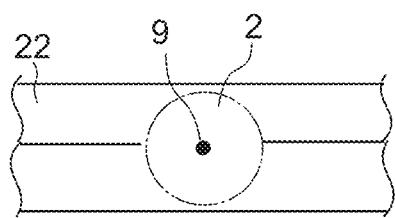
Figure 14D:
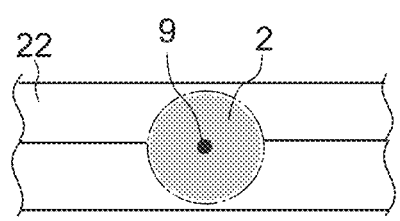
Figure 14E:
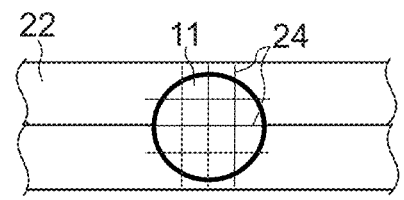

The masking tapes 22 (each having a width of 50 mm for example) are attached in parallel to each other centered on the damage portion 9 (see FIG. 14B). Then, a circle cutter or the like is used to cut out the masking tapes 22 within a predetermined range (for example with a diameter of φ85 mm) with the damage portion 9 at the center so that the wind turbine blade 2 and the damage portion 9 are exposed (see FIG. 14C). Then, the surface of the wind turbine blade 2 within the circular exposed range is sanded to remove the gelcoat layer (see FIG. 14D). Next, the repairing member 11 is provisionally attached. Specifically, the repairing member 11 generated in advance is attached within the circular range where the GFRP layer is exposed with the gelcoat layer removed. Then, a plurality of marking 24 are provided on the repairing member 11, provisionally positioned while taking account the adhesion of the contact surface, and on the masking tapes 22 in the periphery of the repairing member 11. In this process, any of the repairing member 11 and the GFRP layer may be grinded to adjust the contact surface. Further, in order to protect the bonded portion, masking tapes 22 may be orthogonally attached, centered on the damage portion 9, on the masking tapes 22 that have been already attached. In such a case, the masking tape 22 serving as the upper layer is cut into a circular shape in accordance with the circular cutting of the masking tape 22 serving as the lower layer.

Figure 14F:
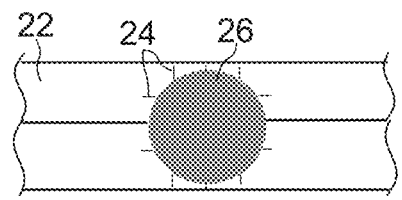

Then, the adhesive 26 is injected to the damage portion 9 to close the damage portion 9, and is also applied to a circular area in the periphery (see FIG. 14F). The adhesive 26 is applied to the bonded surface of the repairing member 11. Specifically, the adhesive 26 is applied within a portion of the bonded surface of the repairing member 11 having a disk shape excluding an approximately 5 mm range from the edge, in such a manner that the applied portion is raised toward the center. This process should be carefully conducted to prevent bubbles from mixing in the adhesive.

Figure 14G:
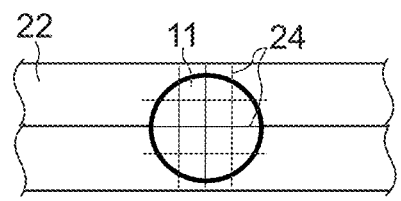
Figure 14H:
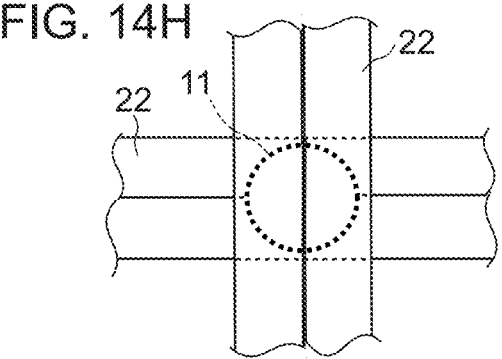
Figure 14I:
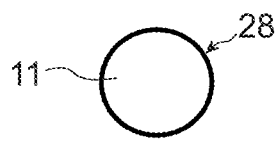
Figure 14J:
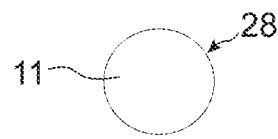

Next, the repairing member 11 is bonded to the wind turbine blade 2 with the markings 24 aligned (see FIG. 14G). In this process, the repairing member 11 is pressed against the surface of the wind turbine blade 2 so that the adhesive 26 evenly overflows from the circumference of the repairing member 11. The adhesive 26 overflowed is removed while being shaped by a spatula. Then, the repairing member 11 thus bonded is fixed until the adhesive 26 is cured by being held with a tape or the like attached to its surface (see FIG. 14H).

When the adhesive 26 is cured, the tape 22 is detached while making sure that the markings 24 are not misaligned. After confirming that there is no gap in the boundary portion 28 between the surface of the wind turbine blade 2 and the repairing member 11, sanding is performed on the periphery of the repairing member 11 to remove the excess adhesive 26. In this process, the step in the boundary portion 28 (see FIG. 14I) may be smoothened to be thin as much as possible (see FIG. 14J). Thereafter, the gelcoat may be applied to the repairing member 11 and the surface of the wind turbine blade 2 on the periphery of the repairing member 11. Then, the surface may be finished by polishing after the gelcoat is cured.

With the method described above, a method of repairing damage on the wind turbine blade 2 with a simple method can be provided.

It should be noted that the disclosure is not limited to the embodiments described above and also includes embodiments with modifications to the embodiments described above and a combination of these embodiments.

The invention claimed is:

1. A method of repairing a wind turbine blade for a damage portion caused by a lightning strike, the method comprising the steps of:
    based on inspection results of the wind turbine blade, determining whether or not the damage portion has a size less than a criterion;
    when the size is less than the criterion, sanding and removing a circular region of a coating layer of the wind turbine blade to expose a glass fiber reinforced plastics (GFRP) layer of the wind turbine blade under the circular region of the coating layer of the wind turbine blade, the exposed glass fiber reinforced plastics layer encompassing the damage portion; and
    bonding onto the exposed glass fiber reinforced plastics layer a repairing member prefabricated and procured such that stacked glass fiber materials embedded in the repairing member is arranged outside an outer skin of the wind turbine blade, the repairing member having a circular shape corresponding to the circular region,
    wherein the exposed glass fiber reinforced plastics layer encompassing the damage portion is covered by the stacked glass fiber materials of the repairing member.

2. The method of repairing a wind turbine blade according to claim 1,
    wherein the repairing member has a size not less than the criterion.

3. The method of repairing a wind turbine blade according to claim 1,
    wherein the criterion is defined as a diameter of d.

4. The method of repairing a wind turbine blade according to claim 3, wherein a diameter D of the repairing member satisfies a relationship of D≥d.

5. The method of repairing a wind turbine blade according to claim 1,
wherein when a direction of attachment of the glass fiber materials forming the repairing member to the wind turbine blade is from an outer side to an inner side of the wind turbine blade, the glass fiber material on the outer side has a larger diameter than the glass fiber material on the inner side.

6. The method of repairing a wind turbine blade according to claim 1,
wherein when a direction of attachment to the wind turbine blade is from an outer side to an inner side of the wind turbine blade,
the step of generating the repairing member includes applying a coating material containing gelcoat, to a surface of the glass fiber material on the outer side, and
the step of bonding the repairing member includes bonding a surface of the repairing member on the inner side to the damage portion.

7. The method of repairing a wind turbine blade according to claim 1,
wherein the repairing member has a circular shape with a thickness of 3 mm or less and a diameter of ϕ200 mm or less, and when a direction of attachment to the wind turbine blade is from an outer side to an inner side of the wind turbine blade, the repairing member is formed to have a protruding shape protruding toward the outer side and having a radius of curvature of 300 mm or more.

8. The method of repairing a wind turbine blade according to claim 1,
wherein repairment with the repairing member is performed when the damage portion is located in a region of 0.2L from a blade tip of the wind turbine blade, where L is a blade length of the wind turbine blade.

9. The method of repairing a wind turbine blade according to claim 1,
wherein a bulging height of the repairing member from an outer skin of the wind turbine blade after the repairing member is bonded is 5 mm or less.

10. The method of repairing a wind turbine blade according to claim 1, further comprising,
after the step of bonding the repairing member, a step of smoothing by sanding a step in a boundary portion between the repairing member and an outer skin of the wind turbine blade, and applying a coating material containing gelcoat.

11. The method of repairing a wind turbine blade according to claim 10,
wherein the step of smoothing includes smoothing to reduce a step in a boundary portion between the repairing member and an outer skin of the blade to 200 μm or less.

12. The method of repairing a wind turbine blade according to claim 1,
wherein the coating layer which is sanded and removed at the circular region includes a gelcoat layer of the wind turbine blade.

13. The method of repairing a wind turbine blade according to claim 1,
wherein the step of bonding the repairing member includes:
applying an adhesive to a surface of the repairing member on an inner side;
injecting the adhesive into damage including a crack or a hole, and applying the adhesive to the damage portion;
pressing the repairing member against the damage portion to make the adhesive overflow from a periphery of the repairing member; and
fixing the repairing member until the adhesive is cured.

14. The method of repairing a wind turbine blade according to claim 1, further comprising
a step of measuring a distance between a blade tip of the wind turbine blade and the damage portion,
wherein when the damage portion is located in a region of 0.2L from the blade tip of the wind turbine blade, where L is a blade length of the wind turbine blade, the step of bonding onto the exposed glass fiber reinforced plastics layer the repairing member prefabricated and precured, is performed.

* * * * *